Oct. 28, 1952

B. H. BARNES ET AL 2,615,769

SLUSH PUMP PISTON

Filed July 19, 1947

INVENTORS
BYRON H. BARNES
BURT S. MINOR
BY
Mason & Graham
ATTORNEYS

Patented Oct. 28, 1952

2,615,769

UNITED STATES PATENT OFFICE 2,615,769

SLUSH PUMP PISTON

Byron H. Barnes, San Marino, and Burt S. Minor, Whittier, Calif.

Application July 19, 1947, Serial No. 762,108

13 Claims. (Cl. 309—23)

1

This invention relates generally to pistons and particularly to pistons used in slush pumps for pumping drilling fluid in rotary well drilling.

There have been many slush pump pistons devised and while they have met with varying degrees of success, so far as we know, none of them has performed as successfully as desired since the abrasive character of the fluid pumped soon results in the best of present types becoming so worn as to require replacement. The pistons usually embody a metal piston body and a pair of flexible annular packing or sealing members mounted thereon which make sealing engagement with the wall of the cylinder and serve to prevent metal-to-metal contact between the piston and cylinder. Since the annular members are used both to effect a seal and to center the metal body of the piston in the cylinder and prevent its contacting the cylinder wall, the annular sealing members wear rapidly, lose their sealing qualities and permit metal-to-metal contact of piston and cylinder. Efforts have been made to prolong the life of these elements by making part of them relatively hard. However, this expedient still leaves much to be desired from the standpoint of a long-wearing piston.

It is therefore an object of this invention to provide a new and improved type of piston for use in a slush pump which is designed to obviate the disadvantages of present types of pistons and provide a long wearing piston. It is a particular object of the invention to provide a construction making use of a light weight metal body and a novel means for supporting the body and centering it in the cylinder independently of the means for effecting a seal between the piston and cylinder wall, thereby permitting a relatively close fit between the piston and cylinder and resulting in a long wearing piston.

More particularly, it is an object to provide a piston construction which embodies a central wear ring and a pair of packing or seal rings positioned on each side of the wear ring. In this connection, it is an object to provide a wear ring for a piston which serves to support the piston in the cylinder but which is so constructed that it cannot act to effect a seal between the wall of the cylinder and the body of the piston. It is a further object to provide such a construction which permits of the use of packing rings of various cross sectional shapes.

It is a further object to provide a piston of the type indicated having a pair of spaced seal rings in which means are provided for venting or relieving the pressure on the trailing or following ring during each stroke of the piston, in order to free the trailing ring from excessive pressure engagement with the wall of the cylinder and thereby prolong the life of the rings.

It is also an object to provide a light metal piston having a bearing metal surface so that should the seal rings and supporting ring permit the metal portion of the piston to contact the cylinder wall, the piston will not gall or abrade it.

It is a further object to provide a construction in which the seal rings and the wear rings can be readily initially mounted on the metal body of the piston and readily and quickly replaced.

A still further object is to provide a piston with means to change the normal pressure angle of the seal rings whereby high pressures can be pumped without distorting the rings into too great a degree of pressure engagement with the cylinder.

Another object of the invention is to provide a particular type of sealing ring construction to enable the attainment of a close fitting piston.

These and other objects will be apparent from the drawing and the following description thereof. Referring to the drawing, which is for illustrative purposes only:

Figure 1:
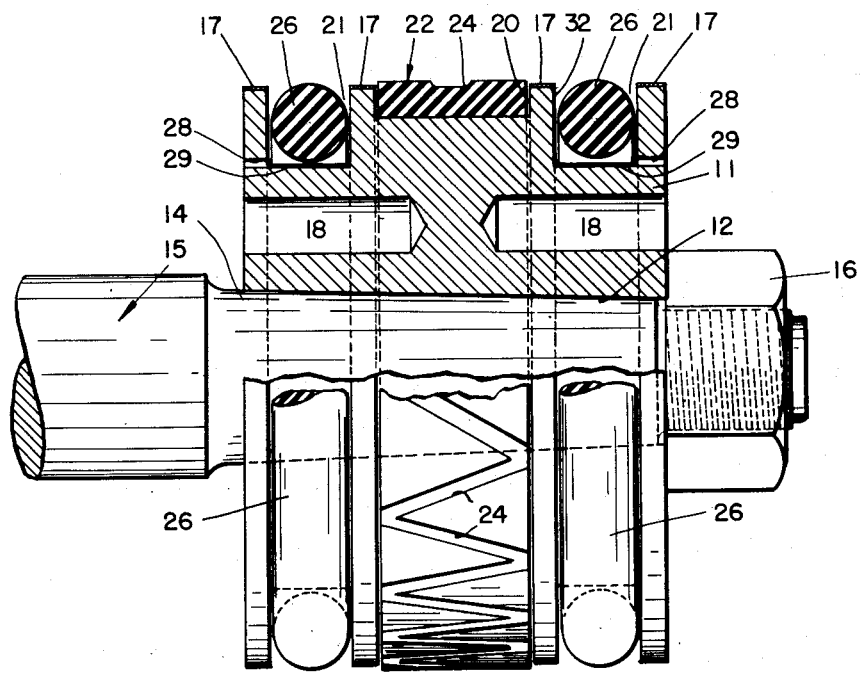
Fig. 1 is a fragmentary sectional view of a piston embodying the invention.

More particularly describing the invention, reference numeral 11 indicates the metal body of a piston which is provided with a tapered bore 12 adapted to receive the tapered seat 14 of the piston rod 15. The piston is maintained on the rod by a nut 16. The peripheral surfaces of the piston may have a coating of bearing metal or the like, 17, if desired.

The body 11 of the piston is preferably made of a relatively light weight strong metal, and can be further lightened by a plurality of bores 18 therein. The body is provided with a relatively shallow and wide central peripheral channel 20, and on each side of this a peripheral groove 21. The central channel 20 accommodates what will be termed a wear ring, indicated generally by numeral 22. This wear ring can be made of rubber, synthetic rubber or of a rubber-like material. The wear ring protrudes radially slightly beyond the piston and is designed to center and support the piston in the cylinder in which it is to work. In order to permit the wear ring to function solely as a means of supporting and centering the metal body 11 of the piston, the wear ring is provided with a plurality of laterally extending grooves or channels 24 which have been shown as forming a zigzag pattern over the peripheral surface of the ring. When the piston is in a cylinder, these channels 24 permit free passage of pressure fluid to opposite sides of the wear ring and thereby prevent distortion of the wear ring by fluid pressure building up at one side or the other of it. The zigzag pattern of the channels 24 prevents the wear ring from wearing the piston wall unevenly; however, other patterns and other types of passages could be employed.

The grooves 21 in the metal body of the piston each contain a packing ring or seal ring 26 and in the form of the invention shown in Fig. 1 these rings are circular in cross section, being commonly known in other installations as O rings. Preferably, the normal outer diameter of the rings exceeds the outer diameter of the piston body and somewhat exceeds the inner diameter of the cylinder in which it works so that when the piston is positioned in the cylinder the rings will effect a seal therewith.

It is a particular feature of this invention that the trailing seal ring is vented or relieved of pressure from its forward side and thereby subjected to less distortion than would otherwise be the case. This is accomplished by providing relief or vent passages for each of the grooves 21. These passages, indicated by numeral 28, extend inwardly from the ends of the piston to the adjacent grooves 21 and are located adjacent the bottom of the grooves. Preferably, channels 29 continue from the inner ends of the passages 28 across the floor of grooves 21.

Figure 3:
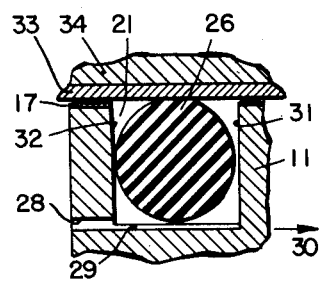
Fig. 3 is a fragmentary sectional view on an enlarged scale through one of the seal rings.

By referring to Fig. 3 and assuming that the piston is moving in the direction of the arrow 30, the ring 26 will be deformed and forced somewhat away from the leading edge 31 of the groove 21, thereby permitting any fluid pressure in this region to escape downwardly in the groove between the ring 26 and the forward wall 31 until the same reaches the vent or relief passages 28. The channels 29 assure the escape of the pressure under the seal rings although such channels are not always necessary. It will be obvious that this construction greatly increases the life of the seal rings since it prevents the trailing seal ring from being forced into tight sealing engagement with the cylinder lining 33 of the cylinder 34.

It will be apparent that with the construction described, the seal rings and the wear ring, being constructed of rubber or a rubber-like material, may be readily expanded into position on the piston by a suitable tool, and that replacement of these rings can be accomplished in a relatively short time.

In the operation of the piston in a cylinder, assuming that the piston shown in Fig. 1 is travelling toward the right, the forward seal ring 26 will be deformed somewhat back against the trailing wall 32 of the groove 21 and effect a seal between the wall of the cylinder and the piston. At the same time as previously described, the trailing seal ring 26 will be relieved of any pressure which might otherwise accumulate or build up in the region ahead of the ring through the vent passages 28. During reciprocation of the piston the wear ring 22 constantly serves to center and maintain the piston properly disposed in the cylinder. The grooves or passages 24 in the wear ring permit of free passage of any fluid pressure to opposite sides of the ring, thereby preventing distortion of the same by accumulated fluid pressure on either side of it.

It will also be apparent that by providing a wear ring 22 having a relatively great area of contact with the cylinder wall the metal body of the piston may be brought into fairly close fitting relation to the cylinder without danger of the piston contacting the cylinder. The wear ring, of course, relieves the seal rings of the burden of maintaining the metal piston supported and centered in the cylinder and thus adds to the life of the seal rings.

Figure 4:
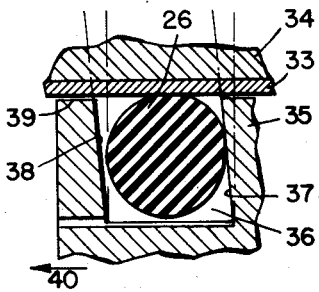
Fig. 4 is a view similar to Fig. 3, showing a modified form of seal ring groove.

In Fig. 4 there is shown a modified form of piston in which means are provided for preventing the accumulated fluid pressure on the forward side of the sealing ring from urging the seal ring into an excessively tight engagement with the cylinder wall. Referring to this figure, the piston, indicated by numeral 35, is provided with a packing ring groove 36 in which the side walls 37 and 38 are inclined from the periphery 39 of the piston toward the center of the piston. With this construction it will be apparent that, assuming the piston to be moving in the direction of the arrow 40, the pressure exerted by the fluid pressure ahead of the piston will in part act to cause the packing ring 26 to ride down the inclined face 37 of the groove, thereby relieving the packing ring of excess pressure which would otherwise distort the same into unduly great pressure engagement with the lining wall 33 of the cylinder 34.

In order to provide for a particularly close fit between the piston and the cylinder when utilizing a lip type of sealing rings and to increase the life of the sealing rings, it is desirable to employ a relatively hard non-metallic ring in the packing groove at the side of the packing ring away from the end of the piston. This ring may be of a relatively hard, reinforced rubber composition or some other suitable material.

Figure 5:
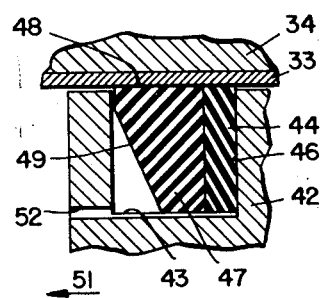
Fig. 5 is a view similar to Fig. 3, but showing the piston equipped with a special form of packing means.

Referring particularly to Fig. 5, the reference numeral 42 indicates the metal body of a piston which is provided with a packing groove 43. This packing groove receives a relatively narrow ring 44 which may be formed of relatively hard rubber, or suitable non-metallic material, which is positioned against the innermost wall 46 of the groove. To facilitate assembly, the ring may be split. The remainder of the groove receives a packing ring 47 which has a relatively wide peripheral face 48 adapted to bear against the lining 33 of the cylinder 34. The packing ring is provided with an inwardly tapered face 49. With this construction the packing ring readily effects a sealing engagement with the cylinder when the piston moves in the direction of the arrow 51 of Fig. 5. When the ring acts as a trailing ring, pressure on the forward surface of the ring is relieved through the vent passage 52 in the same manner as has been described for the form of the invention previously described. The relatively hard ring 44 serves to reduce the clearance between the piston and cylinder so that no portion of the soft flexible sealing lip can wedge between the two.

Figure 6:
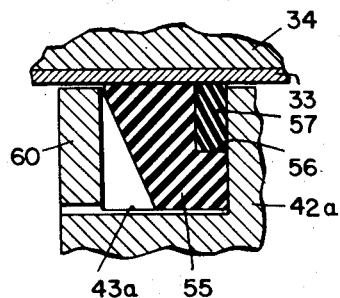
Fig. 6 is a view similar to Fig. 5, but showing a slightly modified form of packing means.
Figure 2:
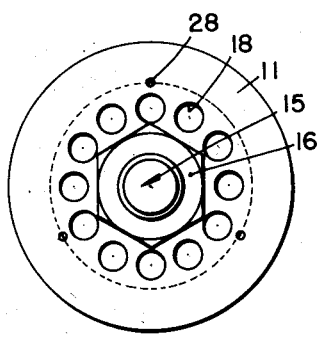
Fig. 2 is a reduced end view of the piston of Fig. 1.

In Fig. 6 there is shown a slightly modified form of the invention wherein the packing ring, indicated by numeral 55, is provided with an annular groove 56 to accommodate a relatively hard non-metallic ring 57. By utilizing a ring 57 having an opening considerably greater in size than the diameter of the groove 43a of the metal piston body 42a, a continuous ring may be employed. In assembling the parts, the ring 57 may be initially readily slipped onto the piston body 42a because of its large internal diameter, after which it can be held in place in the position shown by a suitable tool (not shown) engaging its periphery. While the ring is thus held centered, the packing ring 55 may be expanded radially to pass the wall portion 60. In operation the ring 57 permits of a close fit between the metal body of the piston and the cylinder, thereby having only a minimum of space for distortion of the packing ring and thereby guarding against the packing ring becoming wedged between piston and cylinder.

Although the invention has been particularly shown and described, it is contemplated that various changes and modifications can be made without departing from the scope thereof, as set forth in the claims.

We claim:

1. A piston adapted to be reciprocated in a cylinder comprising a metal body, a non-metallic annular wear ring on said body adapted to center and support said body in a cylinder, and a sealing ring on said body adapted to make sealing engagement with the cylinder, said wear ring being provided with pressure relief passages whereby pressure fluid is free to pass to opposite sides of said wear ring as the piston is reciprocated in a cylinder.

2. The piston defined in claim 1 in which said relief passages are in the form of grooves extending across the peripheral face of the wear ring.

3. A piston adapted to be reciprocated in a cylinder comprising a metal body, a non-metallic annular wear ring on said body adapted to center and support said body in a cylinder, means permitting free passage of pressure fluid to opposite sides of said wear ring as the piston is reciprocated in a cylinder, and a pair of annular sealing rings on said body on opposite sides of said wear ring, said body being provided with means for relieving pressure from the forward side of the trailing sealing ring as the piston is reciprocated in the cylinder.

4. A piston adapted to be reciprocated in a cylinder comprising a metal body having a centrally disposed peripheral channel and a peripheral groove on each side thereof, a rubber-like wear ring in said channel, said ring being provided with passages for permitting free flow of pressure fluid to opposite sides thereof, a flexible sealing ring in each groove, the body of said piston being provided with a vent passage leading from each end thereof to the adjacent groove in the region of the bottom thereof.

5. A piston as defined in claim 4 in which said sealing rings each comprise a rubber composition ring of circular section.

6. In a piston adapted to be reciprocated in a cylinder, a metal piston body having a centrally disposed peripheral channel, a non-metallic wear ring in said channel, said wear ring having grooves extending across the peripheral face thereof whereby pressure fluid may freely pass to opposite sides of said ring as the piston is reciprocated in a cylinder.

7. A piston adapted to be reciprocated in a cylinder comprising a body, an annular wear ring on said body of sufficient diameter to make a sliding fit in the cylinder adapted to center and support said body in the cylinder, and a sealing ring on said body adapted to make sealing engagement with the cylinder, said wear ring being provided with pressure relief passages whereby pressure fluid is free to pass to opposite sides of said wear ring as the piston is reciprocated in a cylinder.

8. A piston adapted to be reciprocated in a cylinder comprising a body, an annular wear ring on said body of sufficient diameter to make a sliding fit in the cylinder adapted to center and support the body in a cylinder, said wear ring being constructed and arranged to permit free passage of pressure fluid to opposite sides thereof as the piston is reciprocated in a cylinder, a pair of annular sealing rings of resilient material on said body on opposite sides of said wear ring of sufficient diameter to positively engage the cylinder, said body being provided with means for relieving pressure from the forward side of the trailing sealing ring as the piston is reciprocated in the cylinder.

9. A piston adapted to be reciprocated in a cylinder comprising a body having a centrally disposed peripheral channel and a peripheral groove on each side thereof, a wear ring in said channel of sufficient diameter to make a sliding fit with the cylinder and having pressure relief passages extending to opposite sides thereof, a flexible sealing ring in each groove, the body of said piston being provided with a vent passage leading from each end thereof to the adjacent groove in the region of the bottom thereof.

10. In a pump or the like, a cylinder, a piston in said cylinder, said piston having a pair of axially spaced peripheral grooves, and a rubber-like packing ring of circular cross section in each groove, each ring being of sufficient diameter to engage the cylinder throughout its periphery, said grooves being wider than said rings, respectively, said piston body being provided with a vent passage leading from each end thereof to the adjacent groove in a region thereof adjacent the floor of the groove, each ring and its respective groove defining a pressure release space radially inwardly of the ring and communicating with said vent passage.

11. In a pump or the like, a cylinder, a piston in said cylinder, said piston having a pair of axially spaced peripheral grooves, and a rubber-like sealing ring in each groove, each ring being of sufficient diameter to engage the cylinder throughout its periphery, said piston having a vent passage leading from each end thereof to the adjacent groove in the region of the floor thereof, each ring and its respective groove defining a pressure release space radially inwardly of the ring communicating with said vent passage.

12. A piston as defined in claim 11 in which each of said pressure relief spaces is defined in part by a channel across the floor of the groove.

13. In a pump or the like, a cylinder, a piston in said cylinder, said piston having a pair of axially spaced peripheral grooves, and a rubber-like packing ring in each groove, each ring being of sufficient diameter to engage the cylinder throughout its periphery, said piston being provided with vent passage means for relieving pressure from the forward side of the trailing packing ring as the piston is reciprocated in the cylinder, said last-mentioned means including a vent passage leading from each end of the piston to the adjacent groove in the region of the bottom thereof, said rings and said grooves being constructed and arranged to permit passage of pressure fluid radially inwardly along the axially inner faces of the grooves and across the bottom of the grooves when said rings are trailing during movement of the piston relative to the cylinder.

BYRON H. BARNES.
BURT S. MINOR.

REFERENCES CITED

The following references are of record in the file of this patent:

UNITED STATES PATENTS

| Number | Name | Date |
|---|---|---|
| 744,643 | Swan | Nov. 17, 1903 |
| 2,029,367 | Geyer | Feb. 4, 1936 |
| 2,115,383 | Christensen | Apr. 26, 1938 |
| 2,144,736 | MacClatchie | Jan. 24, 1939 |
| 2,218,638 | Christenson | Oct. 22, 1940 |
| 2,310,917 | Daly | Feb. 16, 1943 |
| 2,314,683 | Berry | Mar. 23, 1943 |
| 2,349,170 | Jackman | May 16, 1944 |
| 2,388,422 | Krastel | Nov. 6, 1945 |
| 2,427,787 | Hunter | Sept. 23, 1947 |